US008677835B2

(12) United States Patent
Goto et al.

(10) Patent No.: US 8,677,835 B2
(45) Date of Patent: Mar. 25, 2014

(54) TORQUE SENSOR

(75) Inventors: Atsutoshi Goto, Fuchu (JP); Yasuhiro Yuasa, Fuchu (JP); Hiroshi Sakamoto, Kawagoe (JP); Daisuke Goto, Kodaira (JP)

(73) Assignee: Amiteq Co., Ltd. (JP)

( * ) Notice: Subject to any disclaimer, the term of this patent is extended or adjusted under 35 U.S.C. 154(b) by 274 days.

(21) Appl. No.: 13/264,523

(22) PCT Filed: Apr. 16, 2010

(86) PCT No.: PCT/JP2010/056863
§ 371 (c)(1),
(2), (4) Date: Oct. 14, 2011

(87) PCT Pub. No.: WO2010/119958
PCT Pub. Date: Oct. 21, 2010

(65) Prior Publication Data
US 2012/0031202 A1 Feb. 9, 2012

(30) Foreign Application Priority Data
Apr. 16, 2009 (JP) ................................ 2009-100413

(51) Int. Cl.
*G01L 3/02* (2006.01)
(52) U.S. Cl.
USPC ................................ 73/862.193; 73/862.331
(58) Field of Classification Search
USPC .............................. 73/193, 862, 331–862.335
See application file for complete search history.

(56) References Cited

U.S. PATENT DOCUMENTS

| 4,414,855 | A | * | 11/1983 | Iwasaki | 73/862.335 |
| 4,710,683 | A | * | 12/1987 | Bahn et al. | 318/400.04 |
| 5,307,690 | A | * | 5/1994 | Hanazawa | 73/862.333 |
| 5,562,004 | A | * | 10/1996 | Kaise et al. | 73/862.336 |
| 6,392,407 | B1 | * | 5/2002 | Mishiro et al. | 324/207.19 |
| 2008/0116886 | A1 | * | 5/2008 | Yamada et al. | 324/207.21 |

FOREIGN PATENT DOCUMENTS

| JP | 8114518 A | 5/1996 |
| JP | 10019696 A | 1/1998 |
| JP | 2000121461 A | 4/2000 |
| JP | 2000146723 A | 5/2000 |
| JP | 2001091378 A | 4/2001 |

* cited by examiner

*Primary Examiner* — Max Noori
(74) *Attorney, Agent, or Firm* — Rossi, Kimms & McDowell LLP

(57) ABSTRACT

An excitation AC signal biased by a predetermined DC voltage is applied to a coil to allow a DC voltage component in a coil output signal to contain failure information about disconnection, partial disconnection, or the like of the coil. The DC voltage component contained in the coil output signal is detected, and the detected DC voltage is provided as an offset voltage for a failure diagnosis. Further, to check a peak level of the excitation AC voltage, a DC voltage corresponding to the peak level may be contained in the offset voltage. A differential amplifier circuit for obtaining a difference between a coil detection output AC voltage component and a reference AC voltage component outputs an obtained differential signal offset by the offset voltage. Accordingly, the differential signal containing the offset voltage as the failure information is transmitted to a circuit for torque measurement as a torque detection signal via a single output line. The circuit for torque measurement provides the torque detection data based on the transmitted differential signal and at the same time extracts the offset voltage to use it for the failure diagnosis.

9 Claims, 5 Drawing Sheets

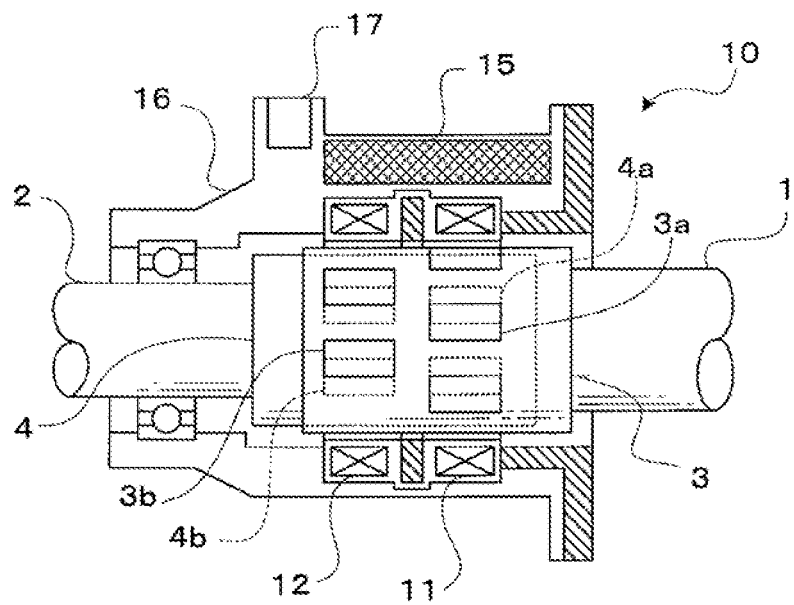
F I G. 2
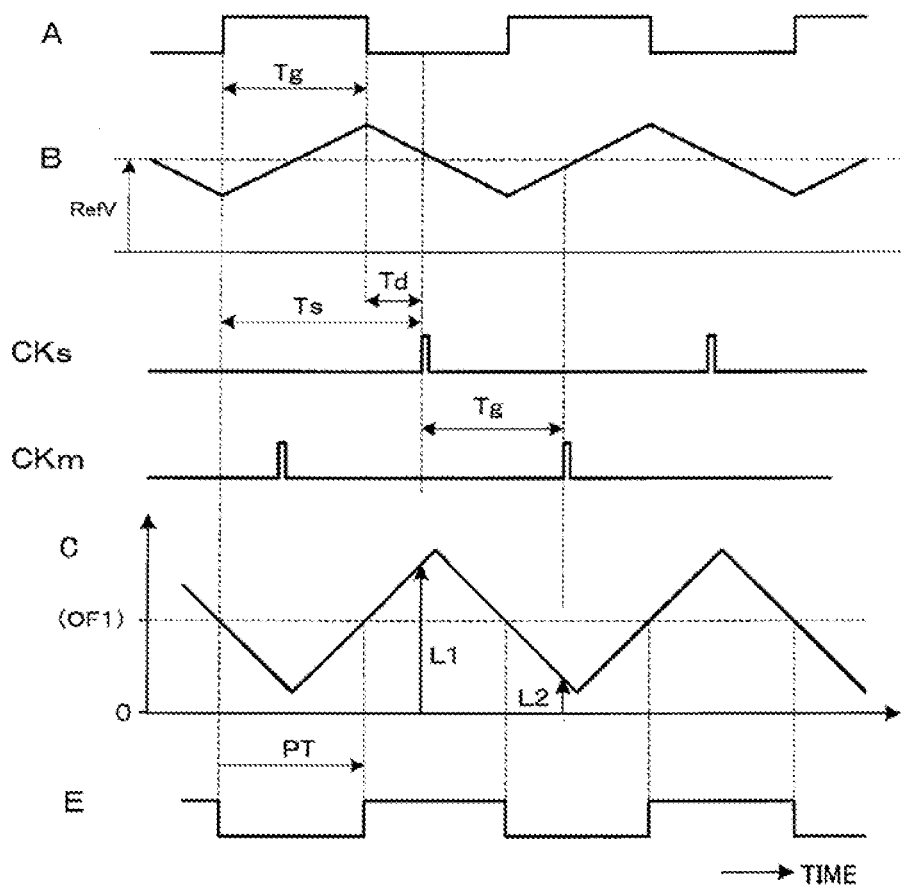
F I G. 3

TORQUE SENSOR

This application is a U.S. National Phase Application of PCT International Application PCT/JP2010/056863 filed on Apr. 16, 2010.

TECHNICAL FIELD

The present invention relates to a torque sensor for detecting relative rotational position between two shafts, for example, a torque sensor suitable for detection of a torsional load applied to a power steering shaft of an automobile.

BACKGROUND ART

A torque sensor has been known that detects the torque generated on an input shaft and an output shaft coupled together via a torsion bar as an amount of torsion (relative rotational position) between the input shaft and the output shaft. For example, Patent Literature 1 mentioned below discloses a torque sensor in which aluminum cylindrical body having a plurality of opening windows forming two rows in a circumferential direction are attached to each of input and output shafts, both the cylindrical bodies are placed such that the two opening window rows of those overlap with each other, detection coils are placed to the respective opening window rows. The change in the overlap of the opening windows in each of the rows according to the amount of torsion (relative rotational position) is detected by the detection coils. However, since the torque sensor disclosed in Patent Literature 1 does not have sufficient compensation for the temperature drift characteristic of the sensor components, the torque sensor has difficulty in obtaining high accuracy of detection and in obtaining a wider dynamic range of the detection output signals and further does not have sufficient failure management for the sensor components.

Patent Literature 2 mentioned below discloses that a torque sensor is provided with a temperature-compensating resistor (such as a thermistor) that is connected with a detection coil in series to compensate the temperature drift characteristic of the detection coil. Further, in Patent Literature 2, the phases of an output AC voltage of the detection coil and excitation AC voltage are synchronized, and then the difference between those voltages are obtained by use of a differential amplifier circuit. The differential voltage is sampled and held at a peak position, thereby obtaining the analogue DC voltage corresponding to a detected torque. However, even such a configuration results in insufficient and limited dynamic range of the detection output signal. For example, an attempt to obtain a seemingly large dynamic range by increasing the amplification factor of the differential amplifier circuit will result in an inappropriate signal-to-noise ratio. A sampling pulse generating circuit for generating a sampling pulse for a sample-and-hold control is configured to perform analogue processing of excitation of AC voltage. Accordingly, this analogue circuit section has a temperature drift characteristic, and it may adversely influence on the detection accuracy.

On the other hand, Patent Literatures 3 to 5 mentioned below disclose torque sensors including failure diagnostic function. In those conventional technologies, failures such as disconnection and partial disconnection, abnormality, and so forth are detected by use of either the phase or the DC component of the output AC signal. However, a toque sensor is still desired that includes a general failure diagnostic function in consideration of both the phase and the DC component of the output AC signal in a simple configuration.

However, in the conventional technologies, each type of failure diagnostic function belongs to an individual diagnostic circuitry. Accordingly, in an extreme case, a diagnosis result has to be transmitted to a central control unit (for example, an ECU in an automobile) via a separate line for each type of failure detection signal, thus resulting in an increased number of lines. For example, in a failure diagnosis in consideration of the DC component of the output AC signal from the detection coil in the conventional technology, the output AC signal is filtered by a low-pass filter, thereby extracting its DC component and evaluating the extracted DC voltage component. Therefore, as an output line from a sensor section to the central control unit, a particular line for the DC voltage component output from the low-pass filter has to be provided separately from an output AC signal line. This causes a problem of increased transmission lines.

Patent Literature 1: JP-A-Hei 8-114518
Patent Literature 2: JP-B-3588684
Patent Literature 3: JP-B-3589053
Patent Literature 4: JP-B-3649057
Patent Literature 5: JP-B-4043116

SUMMARY OF THE INVENTION

The present invention has been made in consideration of such problems, and an objective of the present invention is to provide a torque sensor having a high temperature drift compensation and including a failure diagnosis function in a simple configuration. The present invention intends to provide a torque sensor that contributes to an accurate failure diagnosis based on both AC phase component and DC voltage component, particularly a torque sensor that enables transmission of failure diagnostic information based on the DC voltage component with less transmission lines. Further, the present invention intends to provide a torque sensor that has a configuration in which the dynamic range of a detection output signal can be widened, thereby improving the detection accuracy.

A torque sensor according to the present invention is directed to a torque sensor for detecting a torque that is generated on a first and a second rotational shafts connected together via a torsion bar, which comprises: a sensor section including: at least one coil; a first magnetism-responsive member coupled with the first rotational shaft; and a second magnetism-responsive member coupled with the second rotational shaft, the first and second magnetism-responsive members being configured to cause an impedance change in the coil in response to a relative rotational position of the first and second rotational shafts; a temperature characteristic compensating resistor element connected to the coil; a coil driver circuit which supplies an excitation AC signal biased by a predetermined DC voltage to the coil; an offset voltage generating circuit which generates at least one of a DC voltage component contained in an output of the coil and a DC voltage corresponding to a peak amplitude value of the excitation AC signal as an offset voltage for a failure diagnosis; a differential amplifier circuit which obtains a difference between a detection output AC voltage component contained in the output of the coil and a reference AC voltage component according to the excitation AC signal and biases the obtained difference by the offset voltage to output an offset differential signal; a torque detection section which obtains detection data responsive to the impedance change in the coil as torque detection data by detecting an amplitude of an AC component in the offset differential signal output from the differential amplifier circuit; an offset voltage extraction section which extracts a voltage corresponding to a center of an oscillation of the AC component in the offset differential signal output from the differential amplifier circuit as the offset voltage; and a failure diagnostic section which determines that the torque is in a normal state if the extracted offset voltage falls within a predetermined range and that the torque is in an abnormal state if the offset voltage falls out of the predetermined range.

According to the present invention, the excitation AC signal biased by the predetermined voltage is applied to the coil to obtain from the DC voltage component in a. coil output signal a signal in response to a failure such as disconnection or partial disconnection of the coil, abnormality, or the like. For example, if there is no failure such as disconnection or partial disconnection of the coil, the DC voltage component in the coil output signal corresponds to the predetermined DC voltage for biasing and does not fluctuate. However, if there is a failure such as disconnection or partial connection, the DC component in the coil output signal fluctuates in response to the failure. The offset voltage generating circuit generates such DC voltage component contained in the coil output as the offset voltage for a failure diagnosis, and a failure such as disconnection or partial disconnection of the coil can be noticed by the offset voltage. On the other hand, it is also important in a failure diagnosis to check a fluctuation of a level (peak amplitude value) of the excitation AC signal. Accordingly, the offset voltage generating circuit generates the DC voltage corresponding to the peak amplitude value of the excitation AC signal such that the DC voltage is contained in the offset voltage for the failure diagnosis, and a failure which appears as the fluctuation of the level (peak amplitude) of the excitation AC signal can be therefore noticed.

On the other hand, it has been already known that the differential amplifier circuit for obtaining the difference between the detection output AC voltage component contained in the coil output and the excitation AC signal is used to widen the dynamic range of a torque detection signal. In the present invention, such an advantageous differential amplifier circuit is used to obtain the torque detection signal. In this case, the present invention is characterized in that the offset voltage for the failure diagnosis that is generated in the above manner is incorporated into the differential signal which is the difference between the detection output AC voltage component and the reference AC voltage component obtained by the differential amplifier circuit. The differential signal obtained in such a manner is a single signal, but it contains information about torque, which is a target to be detected, in an amplitude level (peak amplitude value) component of the AC component and the above-described failure information in the offset voltage component. Further, as known, a particular type of failure exhibits a phase change in the coil detection output AC voltage. Information about the failure appearing as such a phase change is contained in the differential signal itself.

As described above, the present invention advantageously allows a single differential signal output from the differential amplifier circuit to contain all of the torque detection information, information about the failure appearing as a fluctuation of the DC component, and information about the failure appearing as a fluctuation of the phase component. Accordingly, the present invention has an excellent effect that the torque detection information and all necessary failure information can be transmitted via single output line of a highly simplified line configuration. Notwithstanding, the torque sensor has an advanced failure diagnostic function. Further, as described above, the differential amplifier circuit provides the torque detection signal having an expanded dynamic range, resulting in a torque sensor with improved detection accuracy. Moreover, the torque sensor includes the temperature characteristic compensation resistor element connected with the coil, thus allowing formation of the coil output signal which has undergone temperature drift compensation. This also results in the torque sensor with improved detection accuracy.

In a preferable embodiment of the present invention, the torque sensor further includes an AC signal forming circuit for forming an excitation AC signal to which a predetermined DC voltage is added. A first circuit section including the temperature characteristic compensation resistor element, the coil driver circuit, the offset voltage generating circuit, and the differential amplifier circuit may be housed in a casing containing the sensor section. A second circuit section including the AC signal forming circuit, the torque detection section, and the offset voltage extraction section may be connected to a side of the casing via transmission lines. The transmission lines may be formed with a single excitation AC signal feeding line, a single detection output line, and a single ground line. The excitation AC signal generated by the AC signal forming circuit may be transmitted to a side of the first circuit section via the excitation AC signal feeding line. The excitation AC signal received by the side of the first circuit section may be fed to the coil driver circuit. Further, the predetermined DC voltage contained in the excitation AC signal may be extracted to be fed as a DC power source for each circuit housed in a section of the casing. The output of the differential amplifier circuit may be transmitted to a side having the torque detection section and the offset voltage extraction section via the detection output line.

Accordingly, the casing containing the sensor section houses the first circuit section that includes the temperature characteristic compensation resistor element, the coil driver circuit, the offset voltage generating circuit, and the differential amplifier circuit. This allows an arrangement of parts where the torque detection information and all the necessary failure information can be transmitted from the sensor section side with the single output line as described above. Therefore, the present invention has an excellent effect that during such operation a separate power source line is not required for the first circuit section on the sensor section side. In other words, the excitation AC signal fed by the single excitation AC signal feeding line contains the power source DC voltage added thereto. Accordingly, the first circuit section on the sensor section side can extract the predetermined DC voltage contained in the excitation AC signal to use it as a DC power source for each of the circuits housed in the casing side section. Therefore, according to this embodiment, a separate DC power source feeding line is not necessary, thus simplifying the transmission line between the first circuit section and the second circuit section.

In another embodiment, a pull-down resistor serving as an interface for a signal from the detection output line may be provided on a side of the second circuit section, and accordingly a DC voltage component depending on a resistance change in trouble with the detection output line may be provided via the pull-down resistor. The offset voltage extraction section may extract a voltage in which the DC voltage component provided via the pull-down resistor is added to the offset voltage. The failure diagnostic section may be capable of responding to abnormality due to trouble with the detection output line. This enables a diagnosis about failure such as contact failure of a connector of the detection output line.

In a preferable embodiment, the sensor section may include first and second coils. The first and the second magnetism-responsive members may be configured and the first and the second coils may be placed such that the first and the second coils have impedance changes inverse to each other in response to the relative rotational position of the first and the second rotational shafts. The first and second coils may be provided with the respective temperature characteristic compensation resistor elements, the coil driver circuits, the offset voltage generating circuits, and the differential amplifier circuits. The torque detection section may detect the amplitude of the AC component in the differential signal output from the differential amplifier circuit corresponding to the first coil to obtain a detection data in response to the impedance change of the first coil as a first torque detection data and may detect the amplitude of the AC component in the differential signal output from the differential amplifier circuit corresponding to the second coil to obtain a detection data in response to the impedance change of the second coil as a second torque detection data. The offset voltage extraction section may extract a voltage corresponding to a center of the amplitude of the AC component of the differential signal output from the differential amplifier circuit corresponding to the first coil as a first offset voltage and may extract a voltage corresponding to a center of the amplitude of the AC component of the differential signal output from the differential amplifier circuit corresponding to the second coil as a second offset voltage. The failure diagnostic section may determine that abnormality is present if at least one of the first and the second offset voltages falls out of a predetermined range. Another failure diagnostic section may be provided which determines that a normal state is retained if a value resulting from an addition of the first and the second torque detection data falls within a predetermined range and that abnormality is present if the value resulting from the addition falls out of the predetermined range. This allows for formation of two kinds of detection signals having characteristics inverse to each other with respect to the relative rotational position (torque), thereby enabling a sensor having redundancy which is considered to be necessary for improved safety of a torque sensor for a power steering shaft of an automobile.

BRIEF DESCRIPTION OF THE DRAWINGS

FIG. 2 is a partially cross-sectional side view, illustrating an embodiment of a mechanism of a sensor section in FIG. 1.
FIG. 3 is a time chart, explaining examples of operations of a torque detection process and a failure diagnostic process.

DETAILED DESCRIPTION OF THE INVENTION

Figure 1:
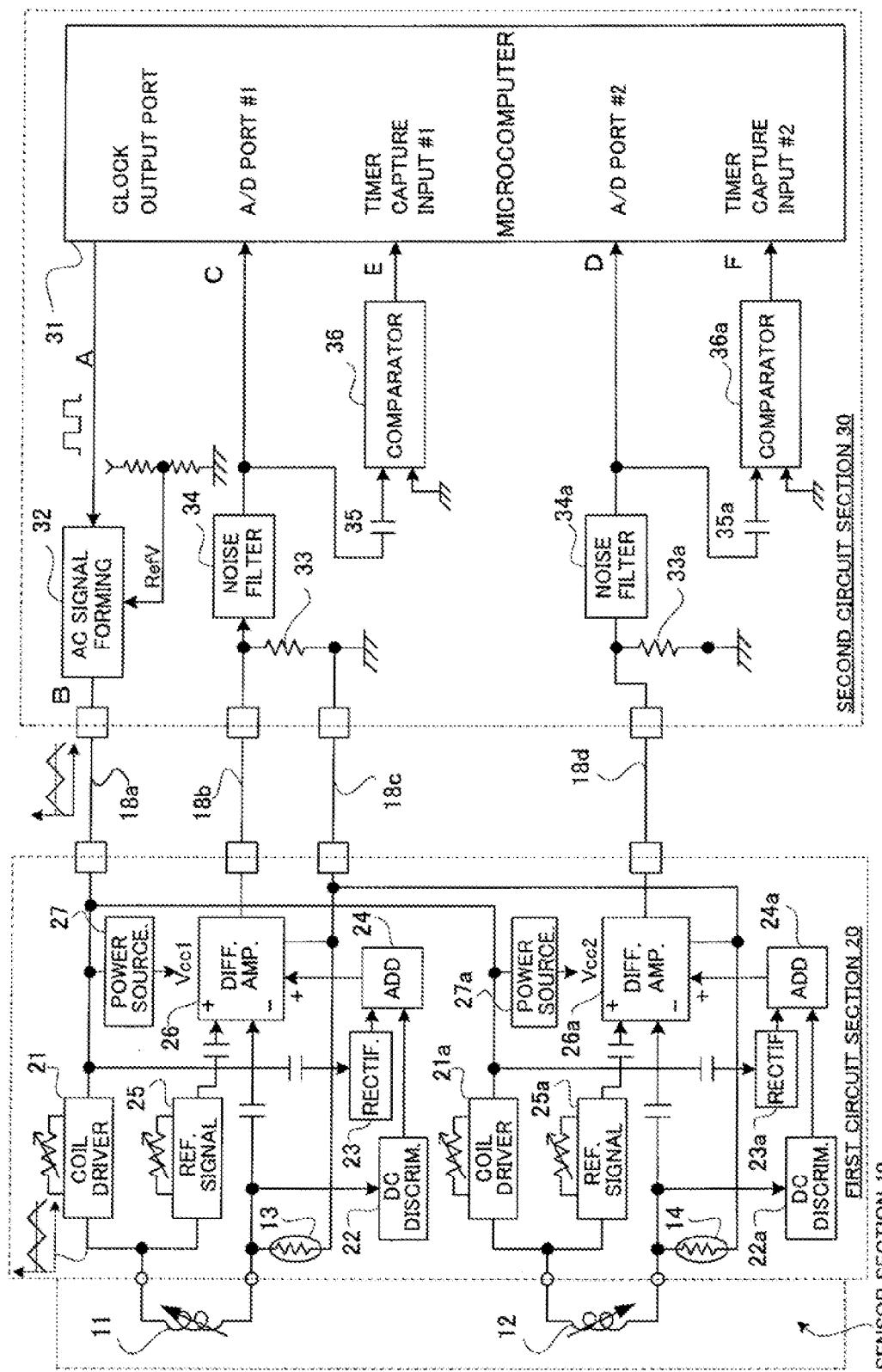
FIG. 1 is a circuit diagram, illustrating an embodiment of a torque sensor in accordance with the present invention.

An embodiment of the present invention will be described hereinafter in detail with reference to the accompanying drawings. FIG. 1 is a circuit diagram illustrating an embodiment of a torque sensor in accordance with the present invention. The torque sensor includes a sensor section 10, a first circuit section 20 disposed adjacent to the sensor section 10, a second circuit section 30 disposed apart from the sensor section 10 and the first circuit section 20.

FIG. 2 is a partially cross-sectional side view illustrating an embodiment of a configuration of the sensor section 10. The torque sensor in accordance with this embodiment detects a torsional torque loaded on a torsion bar of a steering shaft of an automobile. As known, the steering shaft has an input shaft (first rotational shaft) 1 and an output shaft (second rotational shaft) 2 that are coupled together via the torsion bar (not shown). The input shaft 1 and the output shaft 2 are capable of relative rotation to each other within a limited angular range (for example, a maximum range of +6 to −6 degrees) in which the torsional deformation of the torsion bar is allowed. The sensor section 10 is installed around the torsion bar. The sensor section 10 includes a first coil 11, a first magnetism-responsive member 3 coupled to a second coil 12, the input shaft (first rotational shaft) 1, and a second magnetism-responsive member 4 coupled to the output shaft (second rotational shaft) 2. The first and second magnetism-responsive members 3 and 4 are formed of a highly conductive and nonmagnetic (diamagnetic) material (for example, aluminum, copper, or the like) in cylindrical shapes and have respective pluralities of opening windows $3a$, $3b$ and $4a$, $4b$ in two rows at predetermined intervals (angles) in the circumferential directions.

In an assembled state in the figure, the cylinder of the first magnetism-responsive member 3 overlaps with the cylinder of the second magnetism-responsive member 4. The torsion bar (not shown) is positioned inside the overlapping cylinders. The row of the opening windows $3a$ of the first magnetism-responsive member 3 overlaps with the row of the opening windows $4a$ of the second magnetism-responsive member 4, and the first coil 11 is placed around them. The row of the opening windows $3b$ of the first magnetism-responsive member 3 overlaps with the row of the opening windows $4b$ of the second magnetism-responsive member 4, and the second coil 12 is placed around them. The overlaps between the opening windows $3a$ and $4a$ and between the opening windows $3b$ and $4b$ in the respective rows change in response to the relative rotational position between the cylinder of the first magnetism-responsive member 3 and the cylinder of the second magnetism-responsive member 4, in other words, in response to the torsional angle of the torsion bar. In the state where the opening windows $3a$, $4a$ (or $3b$, $4b$) do not overlap with each other at all, a whole internal circumference of the coil 11 (or 12) is covered by a cylindrical material of the magnetism-responsive member 3 (or 4). The eddy current loss then becomes the maximum, and the inductance (impedance) of the coil 11 (or 12) becomes the minimum. Conversely, in the state where the opening windows $3a$ and $4a$ (or $3b$ and $4b$) completely overlap with each other, the area of the cylindrical material of the magnetism-responsive member 3 (or 4) that covers the internal circumference of the coil 11 (or 12) becomes the minimum, thus providing the minimum eddy current loss. The magnetic coupling to the torsion bar (magnetic substance) placed inside via the space formed by the overlapping openings becomes the maximum, thus providing the maximum inductance (impedance) of the coil 11 (or 12).

On the other hand, the opening windows in the respective rows are appropriately arranged to be offset from each other row so that the overlaps of the windows $3a$, $4a$ and $3b$, $4b$ in the respective rows are inverse to each other. For example, in the first magnetism-responsive member 3, the row of the opening windows $3a$ (first row) and the row of the opening windows $3b$ (second row) are formed (arranged) to have a phase shift of just ½ overlap repetition cycle of the opening windows. In such arrangement, in the second magnetism-responsive member 4, the row of the opening windows 4a (first row) and the row of the opening windows 4b (second row) are formed (placed) to be just in-phase. Further, in the state where the torsional angle of the torsion bar is 0, as shown by an example in the figure, the rows of the opening windows are formed (arranged) such that just half portions of the opening windows 3a and 4a in the first row overlap with each other and just half portions of the opening windows 3b and 4b in the second row overlap with each other. When the torsional angle increases in a clockwise direction from the torsional angle of 0, for example, the overlap between the opening windows 3a and 4a in the first row increases, and the inductance (impedance) of the first coil 11 corresponding to this row increases. Meanwhile, the overlap between the opening windows 3b and 4b in the second row decreases, and the inductance (impedance) of the second coil 12 corresponding to this row decreases. Further, when the torsional angle increases in the counter clockwise direction from the torsional angle of 0, the overlap between the opening windows 3a and 4a in the first row decreases, and the inductance (impedance) of the first coil 11 corresponding to this row decreases. Meanwhile, the overlap between the opening windows 3b and 4b in the second row increases, and the inductance (impedance) of the second coil 12 corresponding to this row increases.

As described above, in the sensor section 10, the first and second magnetism-responsive members 3 and 4 are configured and the first and second coils 11 and 12 are arranged such that the first and second coils 11 and 12 have the impedance changes inverse to each other in response to the relative rotational position between input and output shafts (first and second rotational shafts) 1 and 2. Such a configuration of the sensor section 10 is disclosed in JP-A-Hei 8-114518 and others and has been known. Accordingly, a specific configuration of the sensor section 10 is not limited to the example in the figure, but may be any kind of configuration if it can provide two outputs having inverse characteristics about a torque (torsional angle) to be detected.

Returning to FIG. 1, the sensor section 10 includes a first temperature characteristic compensation resistor element (for example, a positive temperature coefficient resistor) 13 connected with the first coil 11 in series and a second temperature characteristic compensation resistor element (for example, a positive temperature coefficient resistor) 14 connected with the second coil 12 in series. In FIG. 2, a circuit board having circuits in the first circuit section 20 including those temperature characteristic compensation resistor elements 13 and 14 is housed in a board housing space 15 in a casing 16 of the sensor section 10 and molded with a synthetic resin. The casing 16 of the sensor section 10 has a connector 17 for attachment and removal of an electric line which connects the sensor section 10 and the detection circuit section 20 together. As described above, since the temperature characteristic compensation resistor elements 13 and 14 are placed adjacent to the coils 11 and 12, they are in the same environment as the coil 11 and 12, and are convenient for compensation of the temperature drift characteristics of the coil 11 and 12. It is preferable to use resistor elements having temperature drift characteristics equivalent to the impedance change characteristics due to the temperature drifts of the coil 11 and 12 for the temperature characteristic compensation resistor elements 13 and 14.

In FIG. 1, the first circuit section 20 includes, as a circuit corresponding to the first coil 11, the temperature characteristic compensation resistor element 13; a coil driver circuit 21 for applying an excitation AC signal biased by a predetermined DC voltage to the coil 11; a DC discriminator circuit 22 for extracting a DC voltage component contained in the output from the coil 11; a rectifier circuit 23 for extracting a DC voltage corresponding to a peak amplitude value of the excitation AC signal; an adder circuit 24 for generating an offset voltage OF1 by adding the outputs of the DC discriminator circuit 22 and the rectifier circuit 23; a reference signal forming circuit 25 for synchronizing the phase of the excitation AC signal output from the coil driver circuit 21 with the phase of the coil output and thereby forming a reference AC voltage component; a differential amplifier circuit 26 for obtaining a difference between a detection output AC voltage component contained in the output from the coil 11 and the reference AC voltage component output from the reference signal forming circuit 25 and biasing the obtained difference by the offset voltage OF1 to thereby generate an offset differential signal; and a power source discriminator circuit 27.

Further, the first circuit section 20 includes, as a circuit corresponding to the second coil 12 just the same as the above-described circuit corresponding to the first coil 11, the temperature characteristic compensation resistor element 14; a coil driver circuit 21a for applying an excitation AC signal biased by a predetermined DC voltage to the coil 12; a DC discriminator circuit 22a for extracting a DC voltage component contained in the output from the coil 12, a rectifier circuit 23a for extracting a DC voltage corresponding to a peak amplitude value of the excitation AC signal; an adder circuit 24a for generating an offset voltage OF2 by adding the outputs of the DC discriminator circuit 22a and the rectifier circuit 23a; a reference signal forming circuit 25a for synchronizing the phase of the excitation AC signal output from the coil driver circuit 21a with the phase of the coil output and thereby forming a reference AC voltage component; a differential amplifier circuit 26a for obtaining a difference between a detection output AC voltage component contained in the output from the coil 12 and the reference AC voltage component output from the reference signal forming circuit 25a and biasing the obtained difference by the offset voltage OF2 to thereby generate an offset differential signal; and a power source discriminator circuit 27a.

The transmission lines (electric lines) connecting the casing 16 side (the side of the sensor section 10 and the first circuit section 20) and the second circuit section 30 together are configured with a coil excitation AC signal feeding line 18a, a detection output line 18b of the first coil, a ground line 18c, and a detection output line 18d of the second coil. The output of the differential amplifier circuit 26 corresponding to the first coil 11 is output to the detection output line 18b. The output of the differential amplifier circuit 26a corresponding to the second coil 12 is output to the detection output line 18d.

The second circuit section 30 corresponds to an ECU (electronic control unit) of an automobile and includes a microcomputer 31 and peripheral circuit elements installed on the printed circuit board of the ECU. The microcomputer 31 forms a digital signal waveform A at a predetermined AC frequency based on an internal clock. For example, a clock generator function of the microcomputer 31 is used to form a clock signal (for example, at a duty ratio of 50%) at the same frequency as a desired frequency of the AC signal for exciting the coil 11 and 12 of the sensor section 10 as the signal waveform A and to output the signal from an output port. An AC signal forming circuit 32 forms an analogue excitation AC signal B to which a predetermined DC voltage RefV (for example, DC 6.5 V) has been added, on the basis of the signal waveform A at an AC frequency formed by the microcomputer 31. The AC signal forming circuit 32 can be configured with a simple analogue circuit which converts a square wave into a triangular wave and a voltage adder circuit, for example. The signal waveform A at an AC frequency formed by the microcomputer 31 is not limited to a clock signal, but may be a relatively accurate digital sinusoidal wave. In such a case, the AC signal forming circuit 32 may include a digital-analogue converter circuit. Alternatively, a sinusoidal signal waveform A obtained by digital-analogue conversion may be output from the microcomputer 31.

The microcomputer 31 is not limited to an existing microcomputer installed in an ECU of an automobile, but a dedicated microcomputer may be provided for the torque sensor in accordance with the present invention. It is the matter of course that a dedicated digital circuit (a discrete circuit, IC, or DSP including clock generator, logic circuit, calculating circuit, memory, and so forth) configured to realize functions equivalent to control and computation necessary for carrying out the present invention may be used instead of the microcomputer 31. Microcomputers and dedicated digital circuits are generically referred to as "digital processing device."

The excitation AC signal formed by the AC signal forming circuit 32 is transmitted to the side having the sensor section 10 and the first circuit section 20 via the excitation AC signal feeding line 18a. The excitation AC signal B received by the first circuit section 20 side is fed to the coil driver circuits 21 and 21a and also to the power source discriminator circuits 27 and 27a. The power source discriminator circuits 27 and 27a extract the predetermined DC voltage RefV contained in the excitation AC signal fed via the excitation AC signal feeding line 18a and feed the voltage to each of the circuits in the first circuit section 20 as DC power sources Vcc1 and Vcc2. Accordingly, a separate DC power source feeding line is not necessary, thereby simplifying the transmission lines between the first circuit section 20 and the second circuit section 30. The coil driver circuits 21 and 21a apply the excitation AC signal B biased by the predetermined DC voltage RefV to each of the coils 11 and 12. Application of signal is not limited to this manner, but the coil driver circuits 21 and 21a temporarily remove the DC voltage RefV from the excitation AC signal B to which the DC voltage RefV for power source has been added, form an excitation AC signal biased by another predetermined DC voltage (for example, a DC voltage of 2 V which is lower than the DC voltage RefV), and thereby apply this signal to each of the coils 11 and 12.

The voltage at a connection point between the first coil 11 and the temperature characteristic compensation resistor element 13 is extracted as the output AC voltage of the first coil 11. After the DC component of the voltage is removed via a capacitor, the output AC voltage is input to the first differential amplifier circuit 26. Similarly, the voltage at a connection point between the second coil 12 and the temperature characteristic compensation resistor element 14 is extracted as the output AC voltage of the second coil 12. After the DC component of the voltage is removed via a capacitor, the output AC voltage is input to the second differential amplifier circuit 26a. The output AC voltages of the coils 11 and 12 are expressed by the voltage ratios between the impedances of the coils 11 and 12 and the respective impedances of the temperature characteristic compensation resistor elements 13 and 14. Accordingly, the impedance changes due to temperature drifts are cancelled, removed or reduced, thereby to enable temperature drift compensation.

Further, the output AC voltage of the first coil 11 which is extracted from the connection point between the first coil 11 and the temperature characteristic compensation resistor element 13 is input to the first DC discriminator circuit 22 and the DC voltage component contained in the output of the coil 11 is extracted. Similarly, the output AC voltage of the second coil 12 which is extracted from the connection point between the second coil 12 and the temperature characteristic compensation resistor element 14 is input to the second DC discriminator circuit 22a and the DC voltage component contained in the output of the coil 12 is extracted. The extracted DC voltage components correspond to the respective predetermined biased DC voltages and do not fluctuate unless there is a failure such as disconnection or partial disconnection. However, if there is a failure such as disconnection or partial disconnection, the DC voltage component will fluctuate in response to the failure. In other words, the DC voltage components represent failure information about disconnection, partial disconnection, or the like of the respective coil 11 and 12.

On the other hand, the rectifier circuit 23 rectifies the AC component of the excitation AC signal and extracts the DC voltage corresponding to a peak amplitude value of the excitation AC signal. The rectifier circuit 23a serves in a similar manner. The extracted DC voltage is retained at a predetermined level unless abnormality occurs to the excitation AC signal. However, if any abnormality such as removal, contact failure, disconnection, or partial disconnection of a connector of the excitation AC signal feeding line 18a occurs, the DC voltage level will fluctuate in response to the abnormality. That is, the DC voltage represents failure information about an excitation AC signal feeding system.

The adder circuit 24 generates the offset voltage OF1 by adding the outputs of the DC discriminator circuit 22 and the rectifier circuit 23. Accordingly, the offset voltage OF1 represents both the information about a failure such as disconnection or partial disconnection of the coil 11 and the information about a failure of the feeding system of the excitation AC signal. The adder circuit 24a generates the offset voltage OF2 by adding the outputs of the DC discriminator circuit 22a and the rectifier circuit 23a. Accordingly, the offset voltage OF2 represents both the information about a failure such as disconnection or partial disconnection of the coil 12 and the information about a failure of the excitation AC signal feeding system. These DC discriminator circuits 22, 22a, the rectifier circuit 23, 23a, and the adder circuits 24, 24a correspond to an offset voltage generating circuit.

Prior to obtaining the differences between the output AC voltages of the coils 11 and 12 and the reference AC voltages on the basis of the coil excitation AC signals by the respective differential amplifier circuit 26 and 26a, the reference signal forming circuits 25 and 25a carries out the phase shifts for synchronizing the phases of the reference AC voltages on the basis of the coil excitation AC voltage signals with the phases of the coil output AC voltages. Since the inductances of the coils 11 and 12 cause predetermined phase delays to the coil output AC voltages with respect to the excitation AC signals, the reference signal forming circuits 25 and 25a shift the phases of the excitation AC signals by the predetermined phase delays, and the differential amplifier circuits 26 and 26a thereby obtains differential signals from the synchronized signals. The DC components are removed from the reference AC voltages input from the reference signal forming circuits 25 and 25a to the differential amplifier circuits 26 and 26a.

The first differential amplifier circuit 26 obtains the differential signal between the output AC voltage of the first coil 11 and the reference AC voltage on the basis of the coil excitation AC signal. Differential amplification computation is carried out in such a manner so that the component derived from the torque to be detected from the output AC voltage is extracted to obtain a large dynamic range (increased sensitivity) for the torque detection. Further, the first differential amplifier circuit 26 adds the offset voltage OF1 to the differential signal to thereby offset (namely, bias) the differential signal to the positive side by the offset voltage OF1. In other words, the addition of the offset voltage OF1 (offsetting) makes the differential signal output from the first differential amplifier circuit 26 oscillate only in the range of positive voltage and contain the failure information which the offset voltage OF1 contains. Accordingly, the differential signal (namely, the offset differential signal) transmitted by the single output line 18b can contain the torque detection information and failure information. Further, this allows obtaining only positive sampled values during sampling of the torque detection value which will be described later.

Similarly, the second differential amplifier circuit 26a obtains the differential signal between the output AC voltage of the second coil 12 and the reference AC voltage on the basis of the coil excitation AC signal and adds the offset voltage OF2 to the differential signal. The differential signal (namely, the offset differential signal) transmitted by the single output line 18d therefore contains the torque detection information and failure information.

The differential signals output from the first and second differential amplifier circuits 26 and 26a are transmitted to the second circuit section 30 via the detection output lines 18b and 18d, respectively. On the second circuit section 30 side, pull-down resistors 33 and 33a are provided that serve as interfaces for the differential signals from the respective detection output lines 18b and 18d. The signal from the detection output line 18b corresponding to the first coil 11 is input to a noise filter 34 via the pull-down resistor 33. The output from the noise filter 34 is input to an A/D port (analogue/digital conversion input port) #1 of the microcomputer 31 and also input to a comparator 36 via a capacitor 35 for removing the DC component. Similarly, the signal from the detection output line 18d corresponding to the second coil 12 is input to the noise filter 34a via the pull-down resistor 33a. The output from the noise filter 34a is input to an A/D port (analogue/digital conversion input port) #2 of the microcomputer 31 and also input to a comparator 36a via a capacitor 35a for removing the DC component.

In a case of trouble such as contact failure at connectors in the detection output lines 18b and 18d, the pull-down resistors 33 and 33a makes the differential signals contain a DC voltage component based on a resistance change due to the trouble. Accordingly, also failure information about the transmission lines of detection signals can be contained in the differential signals.

The noise filters 34 and 34a remove noises mixed in the differential signals during the transmission processes via the detection output lines 18b and 18d. The comparator 36 and 36a shape waveforms of the differential signals output from the respective differential amplifier circuits 26 and 26a and form square wave signals representing the phases of the detection output AC voltages of the respective coils 11 and 12. The outputs from the comparators 36 and 36a are input to timer capture inputs #1 and #2. The comparators 36 and 36a are for carrying out a failure diagnosis based on the failure information contained in the AC phase components in the detection signals. If the failure diagnosis is not carried out based on the failure information contained in the AC phase component in the detection signals, the comparators can be omitted.

FIG. 3 is a time chart for illustrating examples of operations of a torque detection process and a failure diagnostic process, in which the horizontal axis is the time axis. In FIG. 3, a reference symbol A denotes the signal waveform (clock signal) A at a predetermined AC frequency which is formed by the microcomputer 31, and a reference symbol B denotes the excitation AC signal B formed by the AC signal forming circuit in response to the signal waveform A, which is formed of a triangular wave and to which the predetermined DC voltage RefV is added.

A reference symbol CKs denotes a sampling clock formed in the microcomputer 31, has the same period as the clock signal A, and is formed when a time Ts is passed after the clock signal A has risen. In the figure, a time Tg denotes a time which passes when the amplitude of the triangular wave of the excitation AC signal B changes from a minimum value to a maximum value. Further, a sampling clock CKm has the same period as the clock signal A and is formed when the time Tg is passed after the sampling clock CKs has formed. In other words, the sampling clocks CKs and CKm are two-phase clocks having phases shifted by half the period.

In FIG. 3, a reference symbol C denotes an example of a differential signal C which is output from the first differential amplifier circuit 26, passes through the detection output line 18b, and is input to the A/D port #1 of the microcomputer 31 (or an example of a differential signal D which is output from the second, differential amplifier circuit 26a, passes through the detection output line 18d, and is input to the A/D port #2 of the microcomputer 31). The period of the sampling clock CKs is not limited to the same period as the clock signal A, but may have twice length of the clock signal A or the like, that is, may be the period with a length of an integer multiple.

Generally, to detect the impedances of the coils 11 and 12 corresponding to a detected torque, the peak value levels of their output AC voltages are detected. On the other hand, in a case where the signal is sampled at a particular phase timing, it is not necessarily required to sample the signal at the timing of the peak value, to achieve impedance detection. That is, the signal may be sampled constantly at the same phase timings. For example, in the sampling clock CKs, the timing for sampling the differential signals is set to approximately correspond to peak values of the output AC voltages of the coils 11 and 12. Accordingly, the time Ts is set to a time obtained by adding the time Tg from the point at which the clock signal A rises to the point at which the excitation AC signal B reaches a peak and a time Td provided in consideration of the phase delays of the detection output AC voltage with respect to the excitation AC signal B.

The sampling clock CKs is formed around positive peaks of the detection output AC voltage C and D and is used to sample values around the positive (upper) peaks of the detection output AC voltages C and D. The sampling clock CKm is formed around negative peaks of the detection output AC voltage C and D and is used to sample values around the negative (lower) peaks of the detection output AC voltages C and D.

Figure 4:
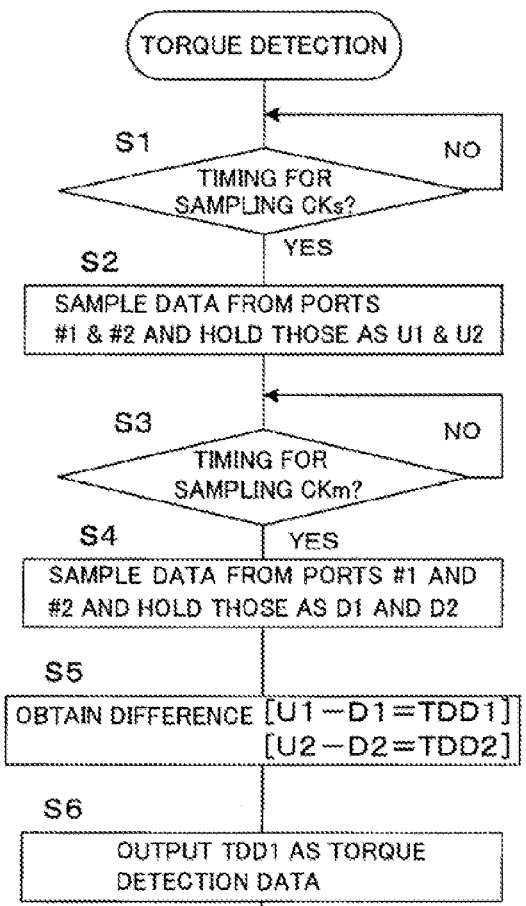
FIG. 4 is a flowchart, illustrating an example of torque detection process executed by a microcomputer in FIG. 1.

FIG. 4 illustrates an example of the torque detection process executed by the microcomputer 31. In step S1, a determination is made about whether it is a timing for the upper peak sampling clock CKs to pulse. If it is a timing for the upper peak sampling clock CKs to pulse, in step S2, digital data of the differential signals C and D from the A/D port #1 and #2 are sampled. The sampled data are held as upper peak held values U1 and U2 in a predetermined register. Next, in step S3, a determination is made about whether it is a timing for the lower peak sampling clock CKm to pulse. If it is a timing for the lower peak sampling clock CKm to pulse, in step S4, digital data of the differential signals C and D from the A/D port #1 and #2 are sampled. The sampled data are held as lower peak held values D1 and D2 in a predetermined register. In step S5, a difference U1−D1 between the upper peak held value U1 and the lower peak held value D1 of the first coil 11 and a difference U2−D2 between the upper peak held value U2 and the lower peak held value D2 of the second coil 12 are computed to obtain a torque detection data TDD1 about the first coil 11 and a torque detection data TDD2 about the second coil 12. In next step S6, the first (main) torque detection data TDD1 is output as a torque detection data in a normal state. The second (sub) torque detection data TDD2 is provided for redundancy, is used in a failure diagnosis which will be described later, and can be used as a substitute torque detection data in a case that abnormality is detected in a detection system for the first coil 11. The differential signal C or D contains the offset voltage OF1 or OF2 as the failure information. As described above, the torque detection data TDD1 or TDD2 is obtained by computing the difference between the upper peak and the lower peak, thus automatically canceling the offset voltage OF1 or OF2 out.

For example, in the example of the differential signal C shown in FIG. 3, the digital value of the differential signal C at the timing at which the sampling clock CKs pulses is L1. This value L1 is held in the register as the upper peak held value U1. Further, the digital value of the differential signal C at the timing at which the sampling clock CKm pulses is L2. This value L2 is held in the register as the upper peak held value D1. The difference U1−D1 between the upper peak held value U1 and the lower peak held value D1 is "L1−L2" and is held as the first torque detection data TDD1.

For example, the least minimum value of the first torque detection data TDD1 is the difference between the least minimum value (for example, approximately OF1) of the upper peak held value U1 and the greatest maximum value (for example, approximately OF1) of the lower peak held value D1 and is thus approximately 0 (for example, U1−D1=approx. OF1−approx. OF1=0). On the other hand, the greatest maximum value of the torque detection data TDD1 is the difference between the greatest maximum value of U1 and the least minimum value of D1 and is thus approximately a predetermined greatest maximum value of a difference D. Accordingly, it can be seen that the dynamic range is widened. The dynamic range of the second torque detection data TDD2 is widened in the same manner. This enables highly sensitive torque detection.

Figure 5:
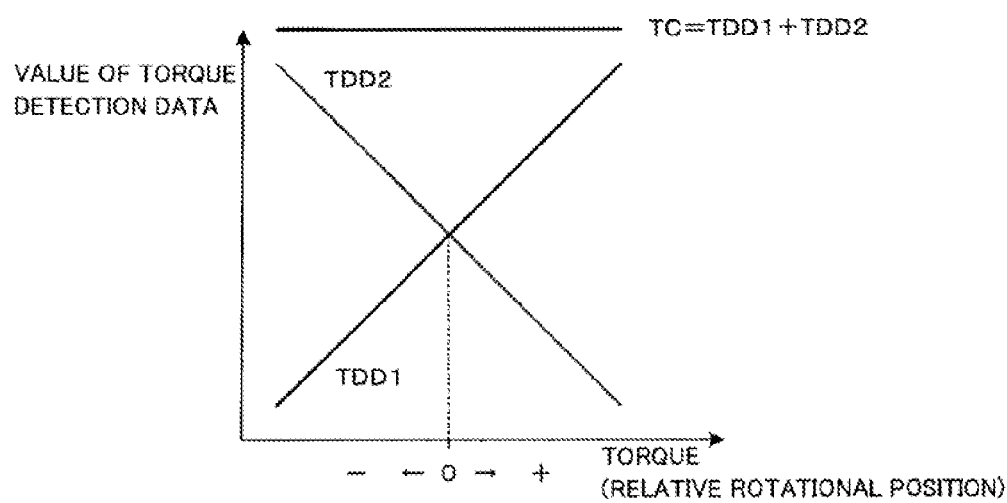
FIG. 5 is a graph, representing the correlation between first (main) and second (sub) torque detection data values and detected torque (relative rotational position).

FIG. 5 is a graph representing an example of the correlation between the values of the first (main) and second (sub) torque detection data TDD1 and TDD2 and detected torque (relative rotational position). As shown in the graph, the functions of the first (main) torque detection data TDD1 and of the second (sub) torque detection data TDD2 have the inverse characteristics about the detected torque (relative rotational position). Normally, a value TC resulting from addition of both the functions always becomes a generally constant value. The position "0" on the horizontal axis represents 0 torque. The area indicated by "+" on the right side represents torsion in the clockwise direction, for example. The area indicated by "−" on the left side represents torsion in the counterclockwise direction, for example. In FIG. 5, the values of the torque detection data TDD1 and TDD2 and the detected torque (relative rotational position) are in a linear correlation. However, they may be in a non-linear correlation.

Figure 6:
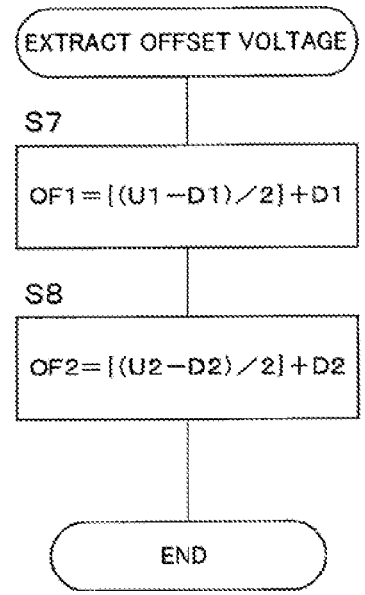
FIG. 6 is a flowchart, illustrating an example of an offset voltage extraction process executed by a microcomputer in FIG. 1.

FIG. 6 illustrates an example of an offset voltage extraction process that is executed by the microcomputer 31. In step S7, according to the following equation for extracting a central voltage within an oscillation of the AC component:

$$OF1=\{(U1-D1)/2\}+D1$$

and using the data held in steps S2 and S4, the offset voltage OF1 associated with the first coil 11 is extracted. In other words, the lower peak held value D1 is subtracted from the upper peak held value U1 of the detection data (differential signal C) of the first coil 11. The resulting value is divided by 2, and the value D1 is then added, thereby extracting the offset voltage OF1. In step S8, similarly, the following equation:

$$OF2=\{(U2-D2)/2\}+D2$$

is used to extract the offset voltage OF2 associated with the second coil 12.

Figure 7:
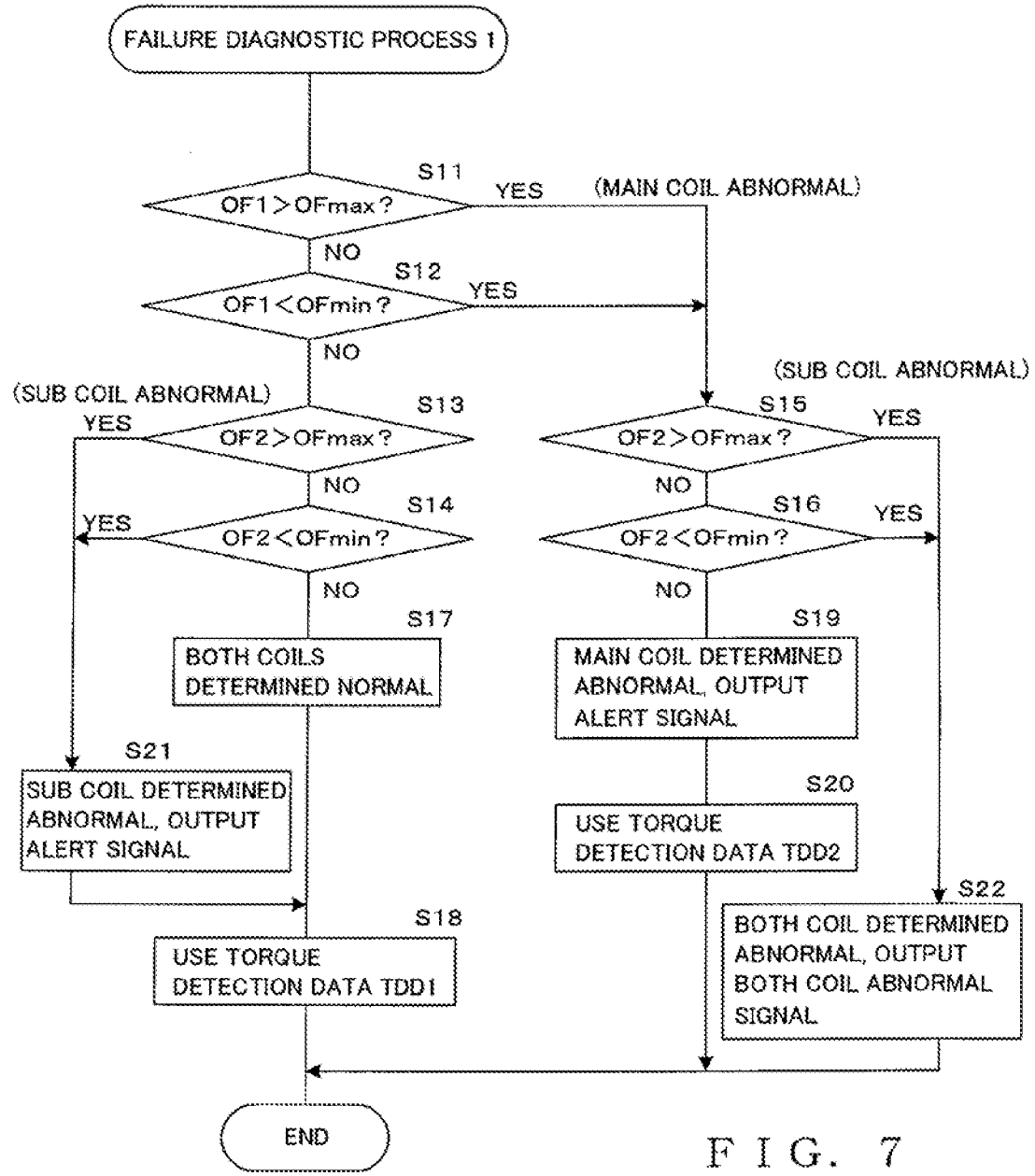
FIG. 7 is a flowchart, illustrating an example of a failure diagnostic process 1 executed by a microcomputer in FIG. 1.

FIG. 7 illustrates an example of a failure diagnostic process 1 executed by the microcomputer 31, in which a failure diagnosis is carried out based on the extracted offset voltages OF1 and OF2. In a case that there is abnormality in any part of circuit systems of the detection coils 11 and 12, for example, such as a case that disconnection, partial disconnection (a line about to be disconnect) in the coil, or short circuit has occurred, or that contact failure, contact loss, or abnormality in a connector or a connection cable has occurred, abnormality occurs to the DC components of detection outputs of the coils 11 and 12. As described above, to facilitate detection of such abnormality in the DC components of the detection outputs of the coils 11 and 12, the offset voltages OF1 and OF2 are contained in the detection signals (the differential signals C and D), and those are extracted in a routine in FIG. 6. Accordingly, the extracted offset voltages OF1 and OF2 facilitate detection of such abnormality.

In step S11, a determination is made about whether the offset voltage OF1 extracted from the detection output of the first (main) coil 11 is higher than a predetermined upper limit value OFmax. In step S12, a determination is made about whether the offset voltage OF1 is lower than a predetermined lower limit value OFmin. If the offset voltage OF1 falls within the range between the predetermined upper limit value OFmax and the lower limit value OFmin, it means that the DC component contained in the detection output of the main coil 11 is not abnormal. In this case, the process goes to step S13 via NO in step S11 and NO in step S12. If the offset voltage OF1 does not fall within the range between the predetermined upper limit value OFmax and the lower limit value OFmin, it indicates that the DC component contained in the detection output of the main coil 11 is abnormal. In this case, the process goes to step S15. In steps S13 to S16, the failure diagnosis about the second (sub) coil 12 is carried out.

In step S13 or S15, a determination is made about whether the offset voltage OF2 extracted from the detection output of the second (sub) coil 12 is higher than the predetermined upper limit value OFmax. In step S14 or S16, a determination is made about whether the offset voltage OF2 is lower than the predetermined lower limit value OFmin. If the offset voltage OF2 falls within the range between the predetermined upper limit value OFmax and the lower limit value OFmin, it means that the DC component contained in the detection output of the sub coil 12 is not abnormal. If the determinations are NO in both steps S13 and S14, it means that both the main coil and the sub coil 12 are normal. In this case, it is determined that both the coils 11 and 12 are normal in step S17, and the microcomputer 31 instructs to use the torque detection data TDD1 obtained from the main coil 11 in step S18.

On the other hand, if the determinations are NO in both steps S15 and S16, it means that there is abnormality with the main coil 11 but the sub coil 12 is normal. In this case, it is determined that there is abnormality with the main coil 11 in step S19, and an alert signal about the situation is output. Then, the microcomputer 31 instructs to use the second torque detection data TDD2 obtained from the sub coil 12 as a substitute torque detection data (step S20). In this case, it is preferable that the second torque detection data TDD2 is inverted so that it obtains the same characteristic as the original torque detection data TDD1 and the obtained data is used for the diagnosis.

If the offset voltage OF2 extracted from the detection output of the sub coil 12 does not fall within the range between the predetermined upper limit value OFmax and the lower limit value OFmin, the determination in step S13 or S14 is YES, or the determination in step S15 or S16 is YES. It indicates that the DC component contained in the detection output of the sub coil 12 is abnormal. If the determination in step S13 or S14 is YES, it is determined that there is abnormality with the sub coil 12 in step S21, and an alert about the situation is output. The microcomputer 31 instructs to use the torque detection TDD1 obtained from the main coil 11 in step S18. If the determination in step S15 or S16 is YES, it is determined in step S22 that there is abnormality with both the coils 11 and 12, and an alert about the situation is output.

In a case that a coil section of the torque sensor in accordance with the present invention is configured only with the first (main) coil 11, the failure diagnostic process 1 shown in FIG. 7 contains only steps S11 and S12. The failure diagnosis may be carried out based on the offset voltage OF1 extracted from the detection output of the first (main) coil 11.

Figure 8:
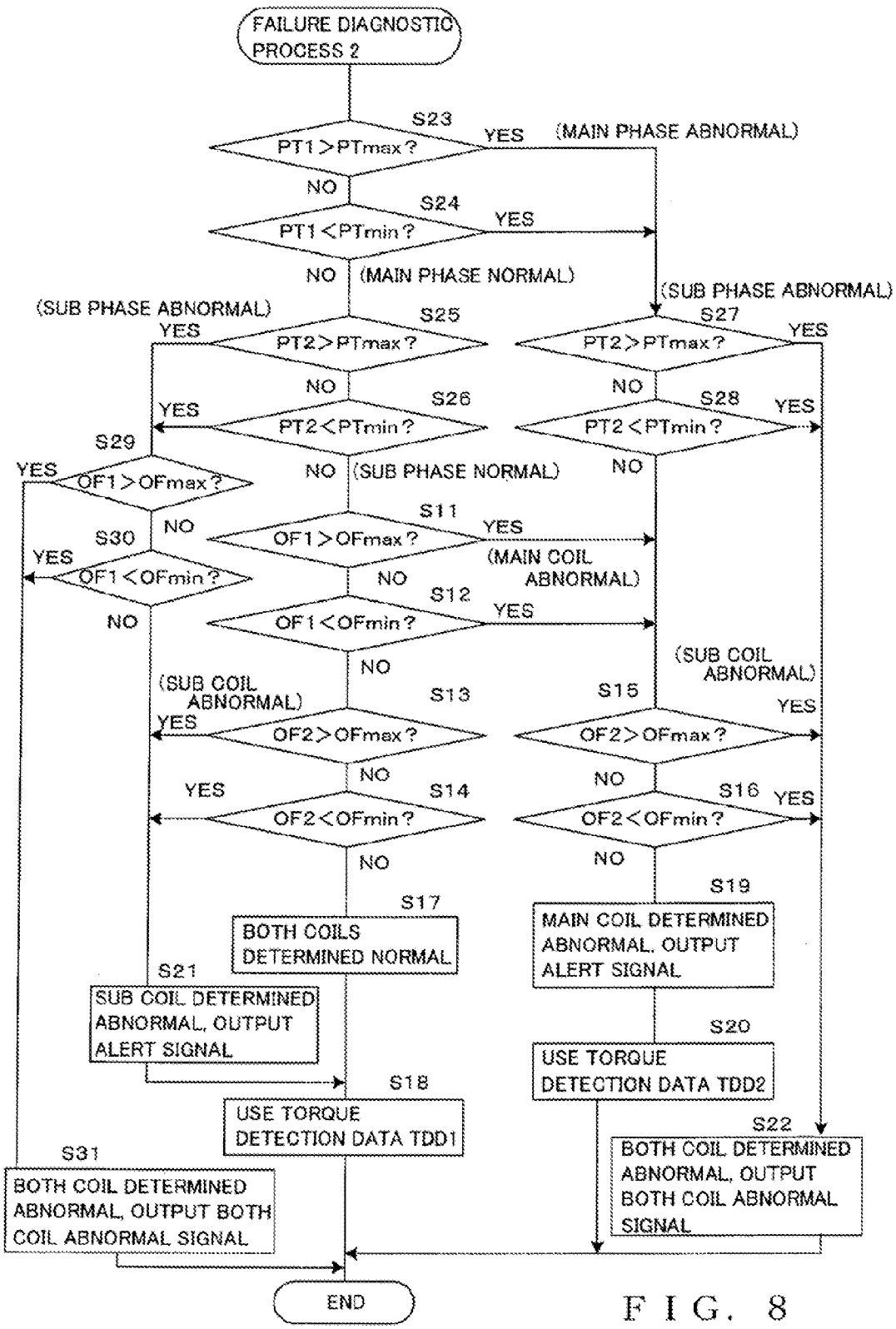
FIG. 8 is a flowchart, illustrating an example of a failure diagnostic process 2 executed by a microcomputer in FIG. 1.

FIG. 8 illustrates an example of a failure diagnostic process 2 executed by the microcomputer 31, in which a failure diagnostic function on the basis of the phase components of the detection outputs is added to the failure diagnosis based on the extracted offset voltages OF1 and OF2. In a case that there is abnormality in any part of circuit systems of the detection coils 11 and 12, for example, such as a case that disconnection, partial disconnection (a line about to be disconnected) in the coil, or short circuit has occurred, or that contact any abnormality has occurred to the magnetism-responsive members 3 and 4 that are targets to be detected, abnormality occurs to the DC components of detection outputs of the coils 11 and 12. A phase advance or delay occurs to the electric phases of the detection output AC voltages C and D of the respective coils 11 and 12 compared to the normal conditions. In the failure diagnostic process on the basis of the phase components added in FIG. 8, a failure diagnosis on the basis of such AC phase components is carried out.

In FIG. 1, the comparators 36 and 36a compare the detection output AC voltages (the AC components of the differential signals C and D) with the ground voltage and output square wave signals E and F in which the detection output AC voltage (the AC component of the differential signals C or D) in a positive voltage range corresponds to 1 and that in a negative voltage range corresponds to 0. Rising edges or the timings of the rising edge of the square wave signals E and F indicate the electrical phases of the detection output AC voltages (the AC components of the differential signals C and D) of the respective coils 11 and 12. The square wave signals E and F output from the respective comparators 36 and 36a are input to the timer capture inputs #1 and #2. A microcomputer 31 samples the timings of the rising edges of the square wave signals E and F input to the timer capture inputs #1 and #2 after a time PT has past from a rise of the clock signal A and holds the sampled time data as phase detection data (see FIG. 3). For example, the phase detection data of the detection output AC voltage (the AC components of the differential signal C) of the first coil 11 is denoted by a reference symbol PT1, and the phase detection data of the detection output AC voltage (the AC components of the differential signal D) of the first coil 11 is denoted by PT2.

In FIG. 8, the step S11 to S22 are the same as the processing steps having like reference numerals in FIG. 7, in which the failure diagnosis on the basis of the DC components is carried out. Step S23 to S31 are added for carrying out the failure diagnosis based on the AC phase components. Step S23 to S31 for carrying out the failure diagnosis on the basis of the AC phase components will be described hereinafter.

In step S23, a determination is made about whether the phase detection data PT1 of the detection output AC voltage (the AC component of the differential signal C) of the first coil 11 is higher than a predetermined upper limit value PTmax. In step S24, a determination is made about whether the phase detection data PT1 is lower than a predetermined lower limit value PTmin. If the phase detection data PT1 falls within a predetermined reference range (the range between the predetermined upper limit value PTmax and the lower limit value PTmin), it means that the electrical phase of the detection output AC voltage of the first coil 11 is normal. In this case, the determinations in steps S23 and S24 are both NO. The process goes to steps S25 and S26, and determinations are made about the phase detection data PT2 of the detection output AC voltage (the AC component of the differential signal D) of the other coil 12 in the same manner. If the phase detection data PT2 of the second coil 12 does not fall within the range between the predetermined upper limit value PTmax and the lower limit value PTmin, the determination in either one of steps S25 and S26 is YES, and the process goes to step S29 and S30. This means that the electrical phase of the detection output AC voltage of the first coil 11 is normal but the electrical phase of the detection output AC voltage of the second coil 12 is abnormal. Steps S29 and S30 are the same determination processes as above-described steps S11 and S12, in which determinations are made about whether or not the offset voltage OF1 extracted from the detection output of the first coil 11 falls within a range between predetermined normal values. If the offset voltage OF1 extracted from the detection output of the first coil 11 falls within the range between the predetermined normal values, the determination in step S30 is NO. The process goes to step S21, and the microcomputer 31 outputs an alert signal indicating that the second coil 12 is abnormal. On the other hand, if the offset voltage OF1 does not fall within the range between the predetermined normal values, the determination in step S29 or S30 is YES. The process goes to step S31. The microcomputer 31 determines that there is abnormality with both the coils 11 and 12 and outputs an emergency abnormality signal.

On the other hand, if the electrical phase of the detection output AC voltage of the first coil 11 does not fall within the range of normal values, the determinations in steps S23 and S24 are YES. The process goes to steps S27 and S28. Determinations are made about the phase detection data PT2 of the detection output AC voltage (the AC component of the differential signal D) of the other coil 12 in the same manner. If the phase detection data PT2 of the second coil 12 does not fall within the range between the predetermined upper limit value PTmax and the lower limit value PTmin, the determination in either one of steps S27 and S28 is YES, and the process goes to step S22. In this case, the result of the diagnosis is that there is abnormality with both the electrical phases of the detection output AC voltages of the first and second coils 11 and 12. The determination in step S22 is that abnormality has occurred to both the coils 11 and 12. The microcomputer 31 then outputs the emergency abnormality signal.

If the phase detection data PT2 of the second coil 12 falls within the range between the predetermined upper limit value PTmax and the lower limit value PTmin, via the determination of NO in step S28, the process goes to step S15. In steps S15 and S16, as described above, a determination is made about whether or not the offset voltage OF2 of the second coil 12 falls within a range between predetermined values. In response to the determination, the microcomputer 31 outputs an alert indicating abnormality with the main coil 11 in step S19, or outputs the emergency abnormality signal indicating that abnormality has occurred, to both the coil 11 and 12 in step S22.

In a case that a coil section of the torque sensor in accordance with the present invention is configured only with the first (main) coil 11, the failure diagnostic process 2 illustrated in FIG. 8 contains only steps S23 and S24 and steps S11 and S12, thereby carrying out the failure diagnosis (S23 and S24) based on the phase component of the detection output of the first (main) coil 11 and the failure diagnosis (S11 and S12) based on the offset voltage OF1 extracted from the detection output of the first (main) coil 11.

What is claimed is:

1. A torque sensor for detecting a torque generated on a first and second rotational shafts interconnected via a torsion bar, the torque sensor comprising:
    a sensor section including: at least one coil; a first magnetism-responsive member coupled with the first rotational shaft; and a second magnetism-responsive member coupled with the second rotational shaft, the first and second magnetism-responsive members being configured to cause an impedance change in the coil in response to a relative rotational position of the first and second rotational shafts;
    a coil driver circuit which supplies an excitation AC signal biased by a predetermined DC voltage to the coil;
    an offset voltage generating circuit which generates at least one of a DC voltage component contained in an output of the coil and a DC voltage corresponding to a peak amplitude value of the excitation AC signal as an offset voltage for a failure diagnosis;
    a differential amplifier circuit which obtains a difference between a detection output AC voltage component contained in the output of the coil and a reference AC voltage component according to the excitation AC signal and biases the obtained difference by the offset voltage to output an offset differential signal;
    a torque detection section which obtains detection data responsive to the impedance change in the coil as torque detection data by detecting an amplitude of an AC component in the offset differential signal output from the differential amplifier circuit;
    an offset voltage extraction section which extracts a voltage corresponding to a center of an oscillation of the AC component in the offset differential signal output from the differential amplifier circuit as the offset voltage; and
    a failure diagnostic section which determines that the torque is in a normal state if the extracted offset voltage falls within a predetermined range and that the torque is in an abnormal state if the offset voltage falls out of the predetermined range.

2. The torque sensor according to claim 1, wherein the offset voltage generating circuit generates, as the offset voltage, a resulting voltage of an addition of the DC voltage component contained in the output of the coil and the DC voltage corresponding to the peak amplitude value of the excitation AC signal.

3. The torque sensor according to claim 1, further comprising:
    a comparator which shapes a waveform of the differential signal output from the differential amplifier circuit; and
    a second failure diagnostic section which determines based on an output of the comparator whether or not a phase of the detection output AC voltage of the coil falls out of a reference range.

4. The torque sensor according to claim 1, wherein the torque detection section forms a first sampling timing signal corresponding to a positive amplitude range and a second sampling timing signal corresponding to a negative amplitude range in an integer multiple periods of a predetermined clock signal, and obtains the torque detection data by sampling the amplitude values of the differential signal output from the differential amplifier circuit at the first and second sampling timing signals and by obtaining a difference between sampled amplitude values.

5. The torque sensor according claim 1, further comprising an AC signal forming circuit for forming an excitation AC signal to which a predetermined DC voltage is added,
    wherein a first circuit section including the coil driver circuit, the offset voltage generating circuit, and the differential amplifier circuit is housed in a casing containing the sensor section housed therein,
    a second circuit section including the AC signal forming circuit, the torque detection section, and the offset voltage extraction section is connected to a side of the casing via transmission lines,
    the transmission lines are formed with a single excitation AC signal feeding line, a single detection output line, and a single ground line,
    the excitation AC signal formed by the AC signal forming circuit is transmitted to a side of the first circuit section via the excitation AC signal feeding line, the excitation AC signal received by the side of the first circuit section is fed to the coil driver circuit, further the predetermined DC voltage contained in the excitation AC signal is extracted to be fed as a DC power source for each circuit in the first circuit section, and
    the output of the differential amplifier circuit is transmitted to a side having the torque detection section and the offset voltage extraction section via the detection output line.

6. The torque sensor according to claim 5,
    wherein a pull-down resistor serving as an interface for a signal from the detection output line is provided on a side of the second circuit section, a DC voltage component according to a resistance change in trouble of the detection output line is provided via the pull-down resistor,
    the offset voltage extraction section extracts a voltage in which the DC voltage component provided via the pull-down resistor is added to the offset voltage, and
    the failure diagnostic section is capable of responding to abnormality due to trouble of the detection output line.

7. The torque sensor according to claim 5, wherein the second circuit section includes a digital processing device, and
    wherein functions of the torque detection section, the offset voltage extraction section, and the failure diagnostic section are executed by the digital processing device,
    the digital processing device further forms a digital signal waveform at a predetermined AC frequency according to an internal clock, and
    the AC signal forming circuit forms the excitation AC signal which is an analogue signal according to the signal waveform at the AC frequency formed by the digital processing device.

8. The torque sensor according to any of claim 1, further comprising a temperature characteristic compensation resistor element connected with the coil.

9. The torque sensor according to claim 8, wherein the sensor section includes first and second coils, the first and the second magnetism-responsive members are configured and the first and the second coils are placed such that the first and the second coils have impedance changes inverse to each other in response to the relative rotational position provided by the first and the second rotational shafts, the first and second coils are provided with the respective temperature characteristic compensation resistor elements, the coil driver circuits, the offset voltage generating circuits, and the differential amplifier circuits, the torque detection section detects the amplitude of the AC component in the differential signal output from the differential amplifier circuit corresponding to the first coil to obtain a detection data in response to the impedance change of the first coil as a first torque detection data and detects the amplitude of the AC component in the differential signal output from the differential amplifier circuit corresponding to the second coil to obtain a detection data in response to the impedance change of the second coil as a second torque detection data, the offset voltage extraction section extracts a voltage corresponding to a center of the amplitude of the AC component of the differential signal output from the differential amplifier circuit corresponding to the first coil as a first offset voltage and extracts a voltage corresponding to a center of the amplitude of the AC component of the differential signal output from the differential amplifier circuit corresponding to the second coil as a second offset voltage, and the failure diagnostic section determines that abnormality is present if at least one of the first and the second offset voltages falls out of a predetermined range, and the torque sensor further comprising another failure diagnostic section which determines that a normal state is retained if a value resulting from an addition of the first and the second torque detection data falls within a predetermined range and that abnormality is present if the value resulting from the addition falls out of the predetermined range.

* * * * *